(12) United States Patent
Blake

(10) Patent No.: US 9,733,964 B2
(45) Date of Patent: Aug. 15, 2017

(54) LIVE SNAPSHOT OF A VIRTUAL MACHINE

(71) Applicant: Red Hat, Inc., Raleigh, NC (US)

(72) Inventor: Eric Blake, Salt Lake City, UT (US)

(73) Assignee: Red Hat, Inc., Raleigh, NC (US)

(*) Notice: Subject to any disclaimer, the term of this patent is extended or adjusted under 35 U.S.C. 154(b) by 152 days.

(21) Appl. No.: 14/011,690

(22) Filed: Aug. 27, 2013

(65) Prior Publication Data

US 2015/0067390 A1  Mar. 5, 2015

(51) Int. Cl.
*G06F 11/14* (2006.01)
*G06F 9/455* (2006.01)
*G06F 3/06* (2006.01)

(52) U.S. Cl.
CPC .......... *G06F 9/45558* (2013.01); *G06F 3/065* (2013.01); *G06F 11/1446* (2013.01); *G06F 2009/45562* (2013.01); *G06F 2201/815* (2013.01); *G06F 2201/84* (2013.01)

(58) Field of Classification Search
CPC ............ G06F 11/1469; G06F 11/1446; G06F 2201/815; G06F 2009/45562; G06F 3/065; G06F 9/45558; G06F 2201/84
See application file for complete search history.

(56) References Cited

U.S. PATENT DOCUMENTS

| 7,529,897 | B1 * | 5/2009 | Waldspurger | ....... G06F 11/1438 711/161 |
|---|---|---|---|---|
| 8,365,167 | B2 | 1/2013 | Beaty et al. | |
| 8,533,410 | B1 * | 9/2013 | Corbett | ................... G06F 12/00 707/637 |
| 2007/0074208 | A1 * | 3/2007 | Ling | ................... G06F 9/45558 718/1 |
| 2009/0113109 | A1 * | 4/2009 | Nelson | ................. G06F 11/203 711/6 |

(Continued)

FOREIGN PATENT DOCUMENTS

WO     WO2012149844     11/2012

OTHER PUBLICATIONS

Li, Jianxin, "iROW: An Efficient Live Snapshot System for Virtual Machine Disk", State Key Lab. of Software Dev. Environ., Beihang Univ., retrieved from http://ieeexplore.ieee.org/xpl/login.jsp?tp=&arnumber=6413673&url=http%3A%2F%2Fieeexplore.ieee.org%2Fxpls%2Fabs_all.jsp%3Farnumber%3D6413673, Dec. 17-19, 2012, 2 pages, Beijing, China.

(Continued)

*Primary Examiner* — David X Yi
*Assistant Examiner* — Zubair Ahmed
(74) *Attorney, Agent, or Firm* — Lowenstein Sandler LLP

(57) ABSTRACT

The subject matter of this specification can be implemented in, among other things, a method including receiving a request to create a live snapshot of a state of a virtual machine at a reference point-in-time. The virtual machine can have a memory and an original disk file. The method further includes creating, at the reference point-in-time, an overlay disk file to copy data from the original disk file. Data modifications after the reference point-in-time are performed in the original disk file but not in the overlay disk file. The method also includes creating a memory snapshot at the reference point-in-time. The method includes providing the live snapshot corresponding to the reference point-in-time. The live snapshot includes the overlay disk file and the memory snapshot.

20 Claims, 4 Drawing Sheets

(56) References Cited

U.S. PATENT DOCUMENTS

| | | |
|---|---|---|
| 2010/0049929 A1 | 2/2010 | Nagarkar et al. |
| 2010/0049930 A1 | 2/2010 | Pershin et al. |
| 2010/0058106 A1 | 3/2010 | Srinivasan et al. |
| 2010/0107158 A1 | 4/2010 | Chen et al. |
| 2010/0174943 A1 | 7/2010 | Liu et al. |
| 2011/0252208 A1 | 10/2011 | Ali et al. |
| 2012/0233611 A1* | 9/2012 | Voccio ................ G06F 9/45558 718/1 |
| 2013/0254383 A1* | 9/2013 | Wray ........................... 709/224 |
| 2015/0213032 A1* | 7/2015 | Powell .............. G06F 17/30079 707/827 |

OTHER PUBLICATIONS

Chamarthy, Kashyap, "Snapshotting with Libvirt for qcow2 Images", retrieved from http://kashyapc.wordpress.com/2011/10/04/snapshotting-with-libvirt-for-qcow2-images/, Oct. 4, 2011, 7 pages.

Hajnoczi et al., "Re: [Qemu-Devel] Are There Plans To Achieve Ram Live Snapshot", Aug. 12, 2013, 2 pages, retrieved from https://lists.gnu.org/archive/html/qemu-devel/2013-08/msg01539.html.

* cited by examiner

LIVE SNAPSHOT OF A VIRTUAL MACHINE

TECHNICAL FIELD

Implementations of the present disclosure relate to a computing system, and more specifically, to creating a live snapshot of a virtual machine.

BACKGROUND

Virtualization entails running programs, usually multiple operating systems, concurrently and in isolation from other programs on a single system. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. A hypervisor may save a state of a virtual machine at a reference point in time, which is often referred to as a snapshot. The snapshot can be used to restore or rollback the virtual machine to the state that was saved at the reference point in time.

DESCRIPTION OF DRAWINGS

The details of one or more implementations are set forth in the accompanying drawings and the description below. Other features and advantages will be apparent from the description and drawings, and from the claims.

DETAILED DESCRIPTION

Figure 1:
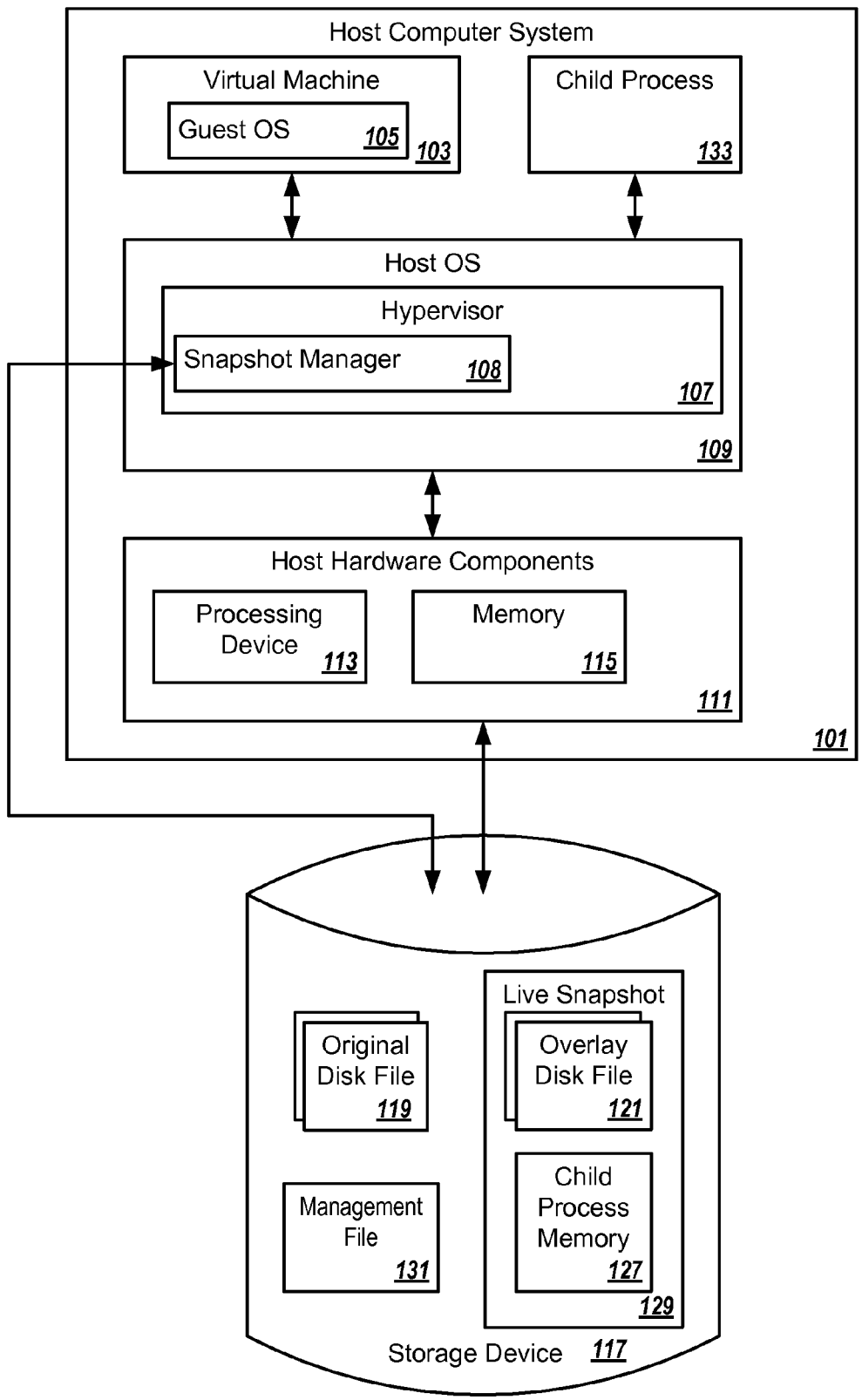
FIG. 1 is a block diagram of a host computer system in accordance with some implementations.

The present disclosure pertains to creating a live snapshot of a virtual machine (VM). A host computer system ("host") provides computing resources (e.g., processing power, memory, storage, input output (I/O) interfaces, devices, etc.) to a VM. The host computer system can use a hypervisor to control the VM's use of the computing resources. The hypervisor can create a point-in-time copy of the state of the VM, which is typically referred to as a snapshot. Snapshots that are created while the VM is executing are referred to as live snapshots. Snapshots can preserve the state of a VM by creating a record of the VM's operating system, disks, memory, and application at a given point in time. Snapshots can be taken at various points in time.

As a VM executes operations, it can make changes to data (e.g., memory, stored data, code) associated with the VM. Changes to the data can come in the form of software updates that can be applied to the VM and to applications that are executed by the VM. Sometimes, changes to the data can cause problems with the VM. The hypervisor can perform a rollback to restore the VM to a previous state captured in the snapshot as if the changes to the data had never happened.

To create a snapshot, contemporary techniques typically include stopping execution of the VM to prevent any input/output operations that might change data in the VM when creating the snapshot. Then, a snapshot of the VM is taken, after which the VM is resumed. The larger the VM and associated data, storage and memory, the longer it will take to complete the snapshot, which also means longer downtime for the VM until the snapshot is complete. Stopping the VM for any period of time, even for a fraction of a second or less, negatively impacts those who try to use the suspended VM while the hypervisor takes the snapshot. VM downtime is especially problematic for high volume VMs where uptime is critical. When a VM has multiple disks, downtime can be even longer because contemporary systems take each disk offline and perform a backup of each disk before resuming the VM. And when the VM has multiple disks, backing up all of the disks can be difficult to manage when using contemporary techniques. When the backup of all of the disks is complete, the VM is resumed. Some contemporary techniques have attempted to backup storage data while the VM is running. Because of the amount of time it can take to backup one or more of the disks, however, the VM continues to modify the disk as it is being backed up. This can create mismatches between the data in the backup and the data in the disk. Data mismatches can corrupt the snapshot and render it unusable.

Aspects of the present disclosure address these shortcomings by providing techniques for creating a consistent and reliable snapshot without any VM downtime. A hypervisor creates an overlay disk file to copy data from an original disk file at a reference point in time. The overlay disk file is another disk file that contains the state of the original disk file at the reference point in time. The overlay disk file is presented as a standalone disk file, but data not yet copied from the original disk file is obtained from the original disk file. Data modifications after the reference point in time are to be performed in the original disk file and not in the overlay disk file. Data from the original disk file is copied to the overlay disk file (e.g., using a background process). In the meantime, if a portion of data in the original disk file is to be modified, that portion of data is copied to the overlay disk file before it is modified. In addition, the hypervisor can create a memory snapshot at the reference point-in-time by generating a copy of the memory. The copy of the memory can be generated by copying a process that is executing the VM, which also includes the memory of the VM. Then, the hypervisor can dump the copied memory to form the memory snapshot. The live snapshot is now complete and includes the overlay disk file and the memory snapshot. When the VM has multiple disks, the hypervisor can create an overlay disk file for each disk. In this manner, the hypervisor can create a consistent, live snapshot of the VM that includes one or more disks with no downtime or interruption to the VM.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

For brevity, simplicity and by way of example, a hypervisor performs many of the operations described herein. It is contemplated that other actors may perform some or all of the operations described herein, including a host operating system, multiple hypervisors, a snapshot manager, and the like, including a combination thereof.

FIG. 1 is a block diagram that illustrates an example of a host computer system 101 that hosts one or more VMs 103. Each VM 103 runs a guest operating system (OS) 105. The VMs 103 may have the same or different guest operating systems 105, such as Microsoft Windows®, Linux®, Solaris®, Mac® OS, etc. The host computer system 101 may be a server, a workstation, a personal computer (PC), a mobile phone, a palm-sized computing device, a personal digital assistant (PDA), etc.

The host computer system 101 runs a hypervisor 107 to virtualize access to the underlying host hardware, making the use of the VM 103 transparent to the guest OS 105 and a user of the host computer system 101. The hypervisor 107 may also be known as a virtual machine monitor (VMM) or a kernel-based hypervisor. The hypervisor 107 may be part of a host OS 109 (as shown in FIG. 1), run on top of the host OS 109, or run directly on the host hardware without an operating system beneath it (i.e., bare metal). The host OS 109 can be the same OS as the guest OS 105, or can be a different OS. The hypervisor 107 can include a snapshot manager 108 that handles snapshot creation.

The host computer system 101 includes hardware components 111 such as one or more physical processing devices (e.g., central processing units (CPUs)) 113, memory 115 (also referred to as "host memory" or "physical memory") and other hardware components. In one implementation, the host computer system 101 includes one or more physical devices (not shown), which can be audio/video devices (e.g., video cards, sounds cards), network interface devices, printers, graphics modules, graphics devices, system components (e.g., PCI devices, bridges, ports, buses), etc. It is understood that the host computer system 101 may include any number of devices.

The host computer system 101 may also be coupled to one or more storage devices 117 via a direct connection or a network. The storage device 117 may be an internal storage device or an external storage device. Examples of storage devices include hard disk drives, optical drives, tape drives, solid state drives, and so forth. Storage devices may be accessible over a local area network (LAN), a wide area network (WAN) and/or a public network such as the internet. Examples of network storage devices include network attached storage (NAS), storage area networks (SAN), cloud storage (e.g., storage as a service (SaaS), etc.), and so forth.

The storage device 117 may store one or more files, such as a set of original disk files 119, and a set of overlay disk files 121, as described herein. As the term is used herein, a set of files refers to one or more files. The storage device 117 may also store one or more live snapshots 129 and a management file 131, each described herein. The files stored by storage device 117 can be any file type and in any format. In some implementations, some of the files can be disk images that represent data on a hard disk. A disk image can be in any format, such as a portable binary image (e.g., raw), copy-on-write (e.g., cow), compressed loop (e.g., cloop), Quick EMUlator (QEMU) copy-on-write format (e.g., qcow, qcow2), and others, such as vmdk, vdi, etc. In an example, original disk file 119 is a raw disk image file, the overlay disk file 121 is a qcow2 file, and the management file 131 is any type of file in a machine-readable format (e.g., XML). When the host computer system 101 is attached to multiple storage devices 117, some files may be stored on one storage device, while other files may be stored on another storage device.

Each disk file 119, 121 may be a single file, set of files or sequence of data (e.g., a contiguous or non-contiguous set of blocks in a block device) that contains the contents and structure representing a storage device such as a hard drive. Each disk file 119, 121 may contain the information that defines a particular VM 103, as described above. The original disk file 119 may be used to execute VM 103. For example, when instantiating a VM, a system administrator can use the original disk file 119 to load a desired guest operating system along with system drivers, guest applications, user data, etc. When a VM 103 is to be loaded, a virtual disk image manager (not shown) may provide hypervisor 107 with a path to an original disk file 119 that contains the VM. Hypervisor 107 may load the VM 103 from the original disk file 119, and the loaded VM 103 may be connected to that original disk file 119 (e.g., to a particular area of storage on storage device 117 that includes the original disk file 119). The original disk file 119 may appear to the VM as a physical storage device. Once a VM 103 is loaded and connected to its original disk file 119, I/O operations (e.g., read and write operations) that it performs may cause data to be read from and/or written to the original disk file 119. Multiple original disk files 119 can be connected to and used by the VM 103. When there are multiple original disk files 119, one of the original disk files 119 can contain the information that defines a particular VM 103 while the other original disk files 119 serve as disks or hard drives for the VM 103. In another example, the overlay disk file 121, in combination with a saved memory state (e.g., child process memory 127), may be used to restore the VM 103 to a previous state.

While the VM is running, the snapshot manager 108 in the hypervisor 107 can receive a request to create a live snapshot 129 of a state of the VM 103. The snapshot manager 108 can receive the request from any source, including from a system administrator, an automated snapshot event scheduler, and the like. Upon receiving the request, the snapshot manager 108 creates an overlay disk file 121 for each original disk file 119 at a reference point in time. The snapshot manager 108 can begin a process to copy data from the original disk file 119 to the overlay disk file 121. In one implementation, the snapshot manager 108 uses a block backup command to copy the original disk data to the overlay disk file 121. The snapshot manager 108 can invoke copy on write semantics to the original disk file 119 such that before the running VM 103 modifies (e.g., writes to) the original disk file 119, it copies the to-be-modified portion of the original disk file 119 to the overlay disk file 121. In this manner, the state of the original disk file 119 is preserved in the overlay disk file 121 without interrupting the ability of VM 103 to perform operations to the original disk file 119. Copying the data to the overlay disk file 121 can be accomplished using a background process and can also be tracked, such as by using a management file 131, as described in further detail below.

Also at the reference point in time, the snapshot manager 108 can create a memory snapshot. The memory snapshot can be created by creating a copy of the memory 115 at the reference point in time. In one implementation, the snapshot manager 108 copies the memory 115 by "forking" a process of the host computing system 101 that is executing the VM 103. For example, a process that is executing a QEMU hypervisor or the VM 103 can be forked. When a process forks, the memory of the original process can be marked as shared, and a new process can be created with the same view of the shared memory. The original process is referred to as a parent process and the new process is referred to as a child process 133. When either the parent process (e.g., the VM 103) or the child process 133 attempts to modify a portion of shared memory, that portion of memory is updated to no longer be shared between the two processes, so that the modification in one process does not affect the other. The snapshot manager 108 can stop the child process 133 from modifying any memory, so that the child's copy of memory remains unchanged from the point in time that the fork was executed. When the VM 103 attempts to modify a page of shared memory, that portion of shared memory is updated to no longer be shared, causing the VM 103 to write to its own memory for that memory page. Meanwhile, the snapshot manager 108 can perform a memory dump operation to transfer the memory of the child process 133 to the live snapshot 129, in particular to the portion of the live snapshot that captures the child process memory 127. In this implementation, once the transfer of the memory of the child process 133 is complete, the snapshot manager 108 can use the child process memory 127 for the live snapshot 129. In this manner a live snapshot 129 is provided without VM 103 downtime and without installing any software or drivers to the VM 103.

In one implementation, the snapshot manager 108 uses a management file 131 to track and monitor the copying of data, such as disk data. The management file 131 can include multiple entries that can be used to track blocks, segments, clusters or portions of data as part of a copy operation. For example, if a disk is divided into 1064 blocks, the management file 131 can have 1064 entries—one for each block. The management file 131 can be used to track data as it is copied from the original disk file 119 to the overlay disk file 121. When using the management file 131, the snapshot manager 108 can divide data into blocks and can assign an identifier to each block. The snapshot manager 108 can associate the identifier with an entry in the management file 131. The snapshot manager 108 can use the management file 131 to track which blocks have been copied to the overlay disk file 121, for example, by marking each block as copied or not copied and updating the corresponding entry in the management file 131. When a block is copied to the overlay disk file 121, the snapshot manager 108 marks the block entry in the management file 131 as 'copied.' Once all of the blocks are marked as 'copied,' the copy process is complete. For example, the management file 131 can use a bitmap to track memory and storage data as it is copied to a file. A '0' in the bitmap can indicate that the block has not been copied and a '1' can indicate that the block has been copied.

In an example, the VM 103 receives a request to modify a data block of the original disk file. The snapshot manager 108 can determine whether the data block has been copied to the overlay disk file, such as by using the management file 131. When the data block has been copied to the overlay disk file 121, the snapshot manager 108 can permit the VM 103 to modify the data block of the original disk file 121. When the data block has not been copied to the overlay disk file 121, the snapshot manager 108 can copy the data block to the overlay disk file 121 and then permit the VM 103 to modify the data block of the original disk file 121.

In some implementations, multiple original disk files 119 are associated with the VM 103. The operations used to create a live snapshot 129 of a VM 103 that has multiple original disk files 119 are similar to those described above. In one implementation, the snapshot manager 108 creates an overlay disk file 121 for each original disk file 119. Each original disk file 119 is set to copy on write. The original disk files 119 are used by the VM 103 for subsequent operations, although before data is written to the original disk files 119, the data to be written is copied to the overlay disk files 121. Data can be copied to each overlay disk file 121 simultaneously—the overlay disk files 121 do not need to be populated in series with respect to each other. The management file 131 can be used to track and coordinate the copy process for each of the multiple original disk files 119 to their respective overlay disk files 121.

In some implementations, the snapshot manager 108 uses copy-on-write (qcow) format files, such as qcow or qcow2 files, for various operations. A qcow file is a type of disk image that uses optimization strategies to delay allocation of storage until it is actually needed. A qcow file grows as data is added, and supports advanced encryption system (AES) encryption, copy on write functionality, snapshots and/or transparent decompression. Qcow formatted disk files also support copy-on-write functionality. Accordingly, a qcow file can be used to store the contents of an original disk file 119 to another disk file (e.g., an overlay file 121), before the data on the original disk file 119 is modified. The other disk file, which is sometimes referred to as an overlay disk file 121, looks like a standalone disk file to the user, but its data is obtained from the original disk file 119. The original disk file 119 contains the path to the other disk file, and an image header gives the location of a path string within the file or object.

Figure 2:
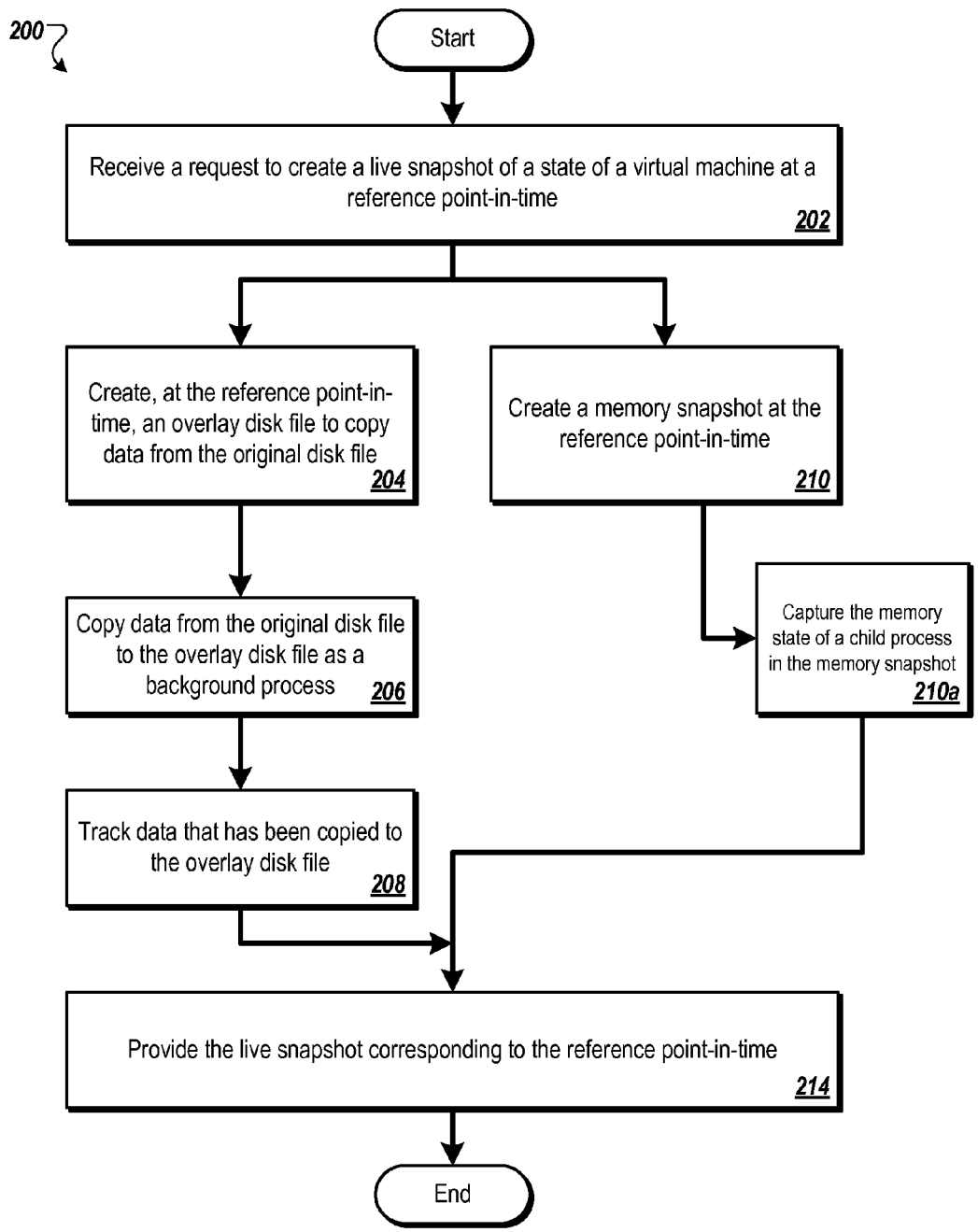
FIG. 2 is a flow diagram of a method for creating a live snapshot in accordance with some implementations.

FIG. 2 is a flow diagram of a method 200 for creating a live snapshot in accordance with some implementations. Method 200 can be performed by processing logic (e.g., in computing system 400 of FIG. 4) that may comprise hardware (e.g., circuitry, dedicated logic, programmable logic, microcode, etc.), software (such as instructions run on a processing device), firmware, or a combination thereof. In one implementation, method 200 is performed primarily by hypervisor 107 of FIG. 1. For clarity of presentation, the description that follows uses the system 101 as examples for describing the method 200. However, another system, or combination of systems, may be used to perform the method 200.

Referring to FIG. 2, in one implementation, method 200 begins at block 202, with the hypervisor receiving a request to create a live snapshot of a state of a VM at a reference point in time. The VM includes a memory and an original disk file that the VM can use to perform disk (e.g., I/O) operations. At block 204, the hypervisor creates an overlay disk file to copy data from the original disk file. Once the overlay disk file is created, data modifications after the reference point in time are performed in the original disk file but not in the overlay disk file. At block 206, the hypervisor copies data from the original disk files to the overlay disk file. The hypervisor can copy data of the original disk file to the disk snapshot file in segments or clusters, as described herein. In one implementation, data is copied to the overlay disk file as a background process. In one implementation, the hypervisor tracks data that has been copied to the overlay disk file and can also track data that remains to be copied to the overlay disk file at block 208. Meanwhile, if the hypervisor identifies a request to modify a data block of the original disk file, the hypervisor can determine if a data block has been copied to the overlay disk file. If the data block has been copied to the overlay disk file, the hypervisor permits the data block of the original disk file to be modified. If the data block has not been copied to the overlay disk file, the hypervisor copies the data block to the overlay disk file.

At block 210, the hypervisor creates a memory snapshot at the reference point in time, where the creation of the memory snapshot involves capturing the memory state of the child process, as shown at block 210a. One implementation of the memory snapshot creation is described in further detail in conjunction with FIG. 3. Block 204 and block 210 can occur at the same point in time. At block 214, the hypervisor provides the live snapshot that corresponds to the reference point in time.

Figure 3:
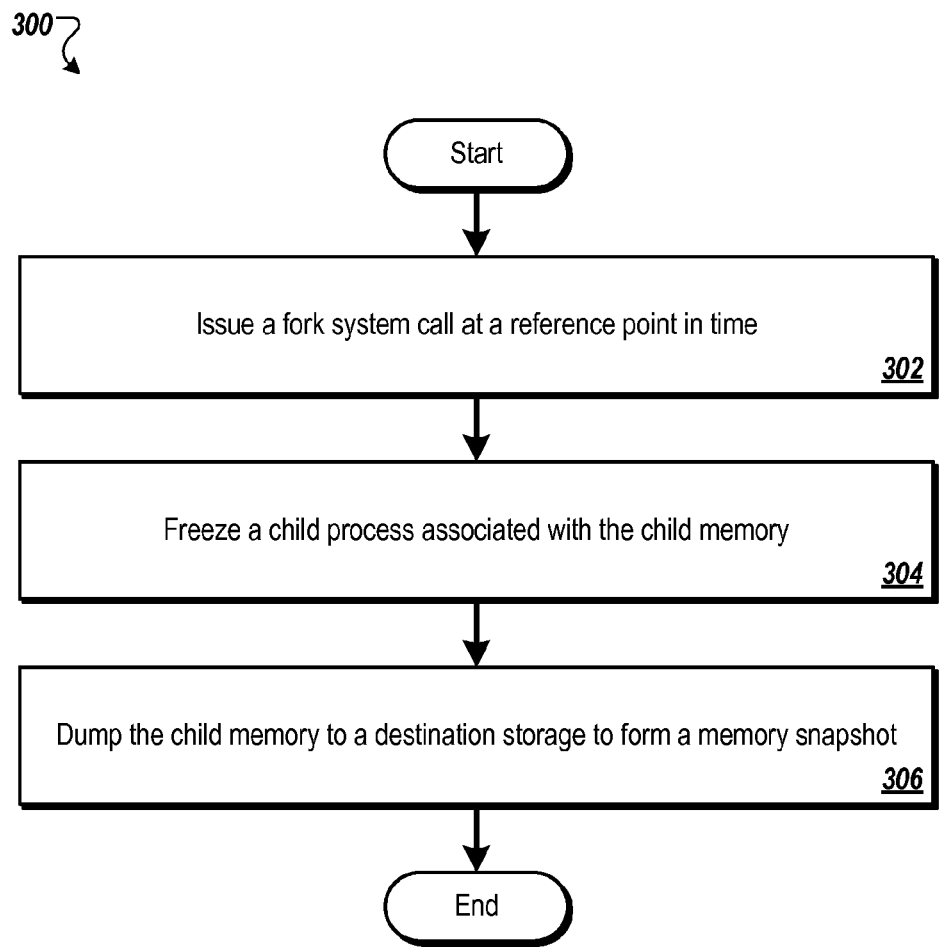
FIG. 3 is a flow diagram of a method for creating a memory portion of a live snapshot in accordance with some implementations.

FIG. 3 is a flow diagram of a method 300 for creating a memory portion of a live snapshot in accordance with some implementations. Method 300 can be performed by processing logic (e.g., in computing system 400 of FIG. 4) that may comprise hardware (e.g., circuitry, dedicated logic, programmable logic, microcode, etc.), software (such as instructions run on a processing device), firmware, or a combination thereof. In one implementation, method 300 is performed primarily by hypervisor 107 of FIG. 1. For clarity of presentation, the description that follows uses the system 101 as examples for describing the method 300. However, another system, or combination of systems, may be used to perform the method 300.

Referring to FIG. 3, in one implementation, method 300 begins at block 302, with the hypervisor issuing a fork system call to replicate a parent process associated with the VM memory at a reference point in time. The hypervisor can issue the fork system call in response to receiving a request to take a snapshot. As a result of the fork system call, the memory of the VM (the original or "parent" process running the VM) can be marked as shared, and a new (child) process can be created with the same view of the shared memory.

At block 304, the hypervisor freezes the child process associated with child memory that corresponds to the shared memory to preserve the state of the memory at the reference point in time. When the child process is frozen, there is no activity (e.g., read/write operations) to the child memory. As to the parent process, if the parent process attempts to write into a page of memory that is still shared by the parent and child, then the memory is changed to no longer be shared, causing the parent process to write to its own memory for that page of memory. At block 306, the child memory is dumped to a destination storage to form a memory snapshot. The memory snapshot can be used to create a live snapshot at the reference point in time.

Figure 4:
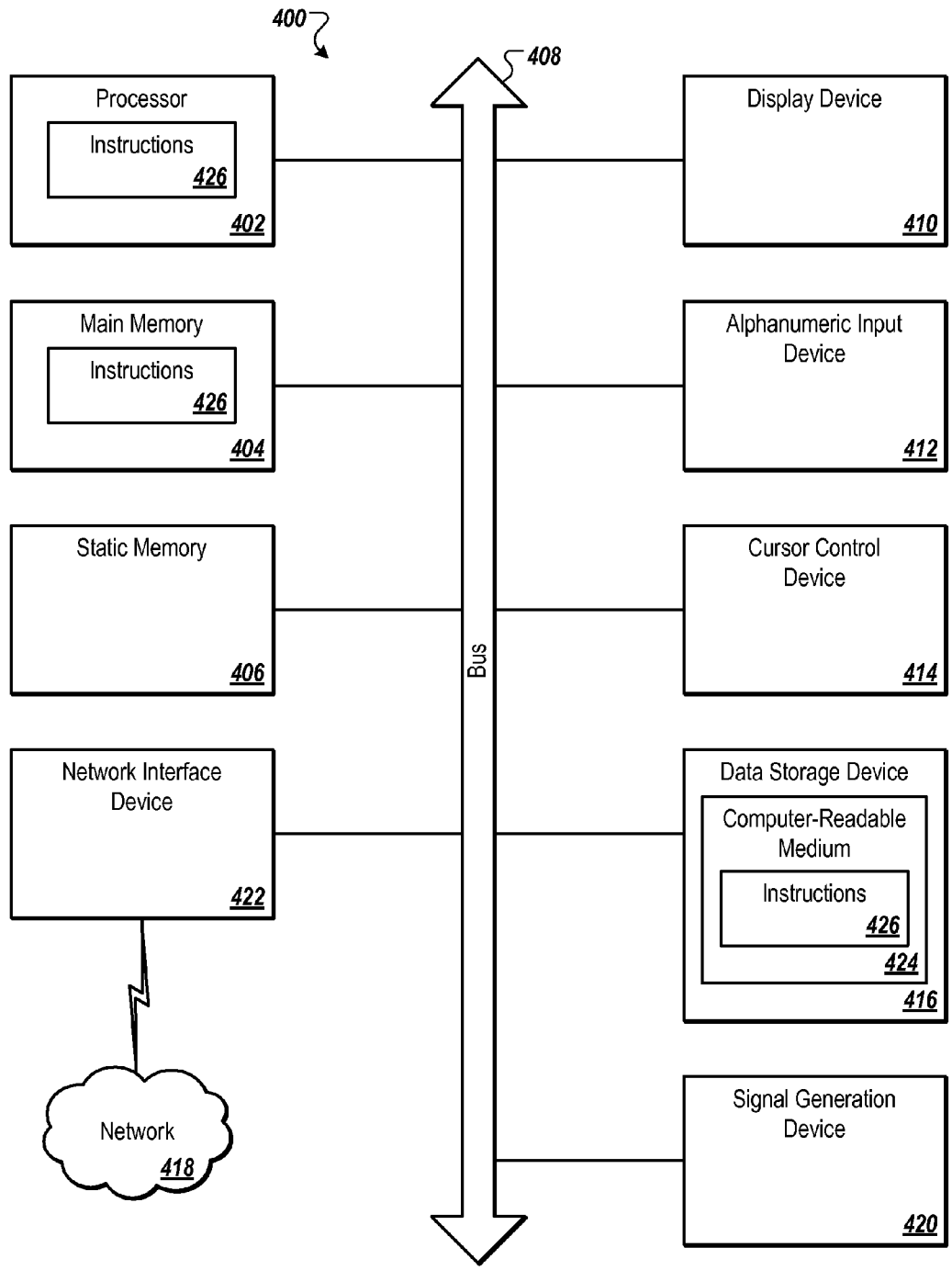
FIG. 4 is a schematic diagram that shows an example of a machine in the form of a computer system.

FIG. 4 is a schematic diagram that shows an example of a machine in the form of a computer system 400. The computer system 400 executes one or more sets of instructions 426 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 426 to perform any one or more of the methodologies discussed herein.

The computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 408.

The processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of the host computer system 101 for performing the operations and steps discussed herein.

The computer system 400 may further include a network interface device 422 that provides communication with other machines over a network 418, such as a local area network (LAN), an intranet, an extranet, or the Internet. The computer system 400 also may include a display device 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable storage medium 424 on which is stored the sets of instructions 426 of the host computer system 101 embodying any one or more of the methodologies or functions described herein. The sets of instructions 426 of the host computer system 101 may also reside, completely or at least partially, within the main memory 404 and/or within the processor 402 during execution thereof by the computer system 400, the main memory 404 and the processor 402 also constituting computer-readable storage media. The sets of instructions 426 may further be transmitted or received over the network 418 via the network interface device 422.

While the example of the computer-readable storage medium 424 is shown as a single medium, the term "computer-readable storage medium" can include a single medium or multiple media (e.g., a centralized or distributed database, and/or associated caches and servers) that store the sets of instructions 426. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, it is appreciated that throughout the description, discussions utilizing terms such as "identifying", "providing", "enabling", "finding", "selecting", "transmitting", "receiving", "preventing", "associating", "creating", "permitting", "holding", "dissociating", "exposing", "initiating", "identifying", "copying," "resuming," "pausing," "recording," "checking," "writing," "receiving," "updating," "suspending," "generating," "breaking," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

It is to be understood that the above description is intended to be illustrative, and not restrictive. Other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving a request to create a live snapshot of a state of a virtual machine at a reference point-in-time, the virtual machine having a memory and an original disk file;
   creating, by a processor at the reference point-in-time, an overlay disk file to copy data from the original disk file;
   tracking, by the processor, data blocks copied from the original disk file to the overlay disk file using an indicator;
   determining, by the processor, using the indicator, that a data block has been copied to the overlay disk file in response to identifying a request to modify the data block of the original disk file;
   in response to determining that the data block has been copied to the overlay disk file, permitting, by the processor, the data block of the original disk file to be modified;
   creating, by the processor, a memory snapshot at the reference point-in-time, wherein creating the memory snapshot comprises:
      issuing a system call at the reference point in time to instantiate a child process of the virtual machine, the child process comprising a child memory that represents a shared memory between the virtual machine and the child process;
      preventing the child process from modifying at least a portion of the shared memory by freezing the child process; and
      dumping the child memory to a destination storage to form the memory snapshot; and
   providing, by the processor, the live snapshot corresponding to the reference point-in-time, the live snapshot comprising the overlay disk file and the memory snapshot.

2. The method of claim 1 further comprising copying data from the original disk file to the overlay disk file using a background process.

3. The method of claim 1 further comprising:
   in response to the data block not being copied to the overlay disk file, copying the data block to the overlay disk file, and permitting the data block of the original disk file to be modified.

4. The method of claim 1, wherein the overlay disk file comprises a plurality of data blocks, the method further comprising tracking a number of data blocks that have been copied to the overlay disk file using a management file.

5. The method of claim 1 wherein the overlay disk file is created in response to receiving a block backup command.

6. The method of claim 1, wherein the system call comprises a fork system call.

7. The method of claim 1, wherein the live snapshot is created without installing software to the virtual machine.

8. The method of claim 1, wherein the live snapshot is created without virtual machine downtime.

9. A system comprising:
   a memory;
   a processor, operatively coupled to the memory, to:
      receive a request to create a live snapshot of a state of a virtual machine at a reference point-in-time, the virtual machine having an original disk file and being associated with the memory;
      create, at the reference point-in-time, an overlay disk file to copy data from the original disk file;
      track data blocks copied from the original disk file to the overlay disk file using an indicator;

determine, using the indicator, that a data block has been copied to the overlay disk file in response to identifying a request to modify the data block of the original disk file;

in response to determining that the data block has been copied to the overlay disk file, permit the data block of the original disk file to be modified;

create a memory snapshot at the reference point-in-time, wherein to create the memory snapshot, the processor is further to:

issue a system call at the reference point in time to instantiate a child process of the virtual machine, the child process comprising a child memory that represents a shared memory between the virtual machine and the child process;

prevent the child process from modifying at least a portion of the shared memory by freezing the child process; and dump the child memory to a destination storage to form the memory snapshot; and provide the live snapshot corresponding to the reference point-in-time, the live snapshot comprising the overlay disk file and the memory snapshot.

10. The system of claim 9, wherein the overlay disk file comprises a plurality of data blocks, the processor further to track a number of data blocks that have been copied to the overlay disk file using a management file.

11. The system of claim 9, wherein the system call comprises a fork system call.

12. The system of claim 9, wherein the live snapshot is created without virtual machine downtime.

13. A non-transitory computer-readable storage medium comprising instructions that, when executed by a processor, cause the processor to:

receive a request to create a live snapshot of a state of a virtual machine at a reference point-in-time, the virtual machine having a memory and an original disk file;

create at the reference point-in-time, an overlay disk file to copy data from the original disk file;

track, by the processor, data blocks copied from the original disk file to the overlay disk file using an indicator;

determine, using the indicator, that a data block has been copied to the overlay disk file in response to identifying a request to modify the data block of the original disk file;

in response to determining that the data block has been copied to the overlay disk file, permit the data block of the original disk file to be modified;

create, by the processor, a memory snapshot at the reference point-in-time, wherein to create the memory snapshot, the processor is further to:

issue a system call at the reference point in time to instantiate a child process of the virtual machine, the child process comprising a child memory that represents a shared memory between the virtual machine and the child process;

prevent the child process from modifying at least a portion of the shared memory by freezing the child process; and dump the child memory to a destination storage to form the memory snapshot; and provide the live snapshot corresponding to the reference point-in-time, the live snapshot comprising the overlay disk file and the memory snapshot.

14. The non-transitory computer-readable storage medium of claim 13, comprising further instructions that, when executed by the processor, cause the processor to copy data from the original disk file to the overlay disk file using a background process.

15. The non-transitory computer-readable storage medium of claim 13 comprising further instructions that, when executed by the processor, cause the processor to:

copy, in response to the data block not being copied to the overlay disk file, the data block to the overlay disk file, and permit the data block of the original disk file to be modified.

16. The non-transitory computer-readable storage medium of claim 13, wherein the overlay disk file comprises a plurality of data blocks, and the non-transitory computer-readable storage medium comprises further instructions that, when executed by the processor, cause the processor to track a number of data blocks from the plurality of data blocks that have been copied to the overlay disk file using a management file.

17. The non-transitory computer-readable storage medium of claim 13, wherein the overlay disk file is created in response to receiving a block backup command.

18. The non-transitory computer-readable storage medium of claim 13, wherein the system call comprises a fork system call.

19. The non-transitory computer-readable storage medium of claim 13, wherein the live snapshot is created without installing software to the virtual machine.

20. The non-transitory computer-readable storage medium of claim 13, wherein the live snapshot is created without virtual machine downtime.

* * * * *